April 5, 1932.　　　G. H. RUGGLES　　　1,852,481
ORE FLOTATION
Filed Nov. 9, 1929
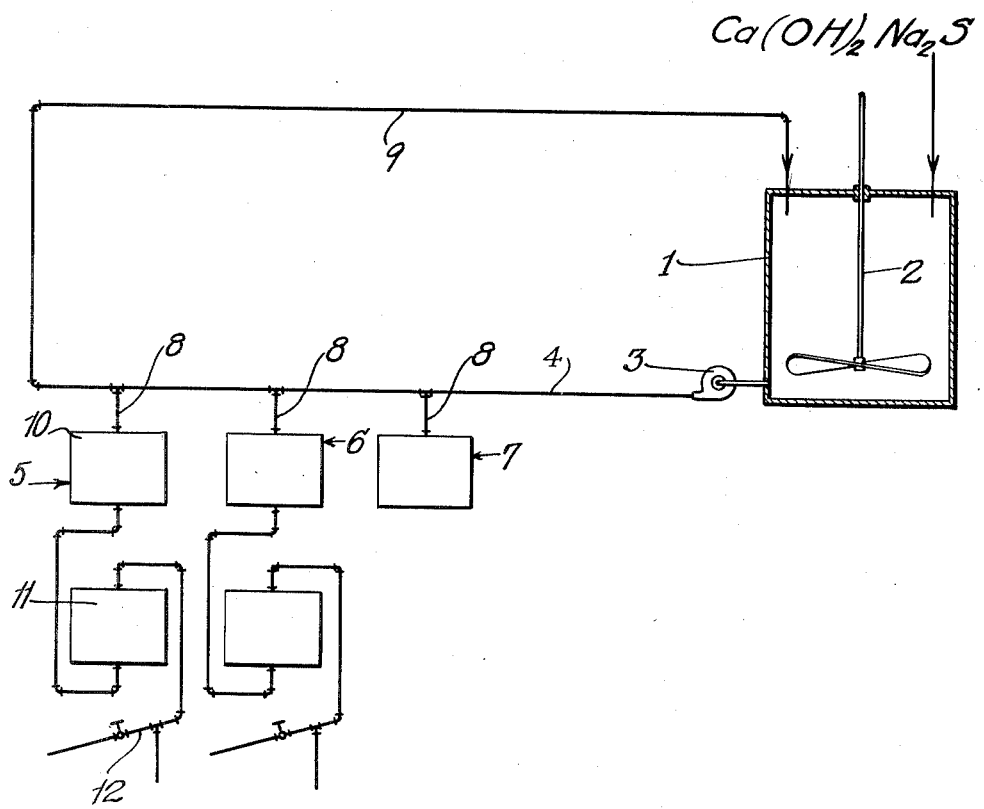
Inventor
GUY H. RUGGLES.
By His Attorneys
Usina & Rauber Patented Apr. 5, 1932

1,852,481

UNITED STATES PATENT OFFICE

GUY H. RUGGLES, OF INSPIRATION, ARIZONA

ORE FLOTATION

Application filed November 9, 1929. Serial No. 405,865.

This invention relates to improvements in the flotation of ores, particularly of the sulphide and oxide ores of copper.

An object of the invention is to provide a process for increasing the recovery of copper or other metal of the ore being treated in a flotation process of ore separation.

In the attainment of this object in accordance with the present invention, the ores are treated with a mixture of an alkaline earth hydroxide and an alkaline sulphide, or a mixture of an alkaline hydroxide and an alkaline earth sulphide, or with the reaction products of a mixture of these combinations of substances. The mixture is thoroughly and intimately incorporated with the finely ground ores, preferably during the grinding. The mixture is preferably, and most conveniently made and handled in water, forming an emulsion of suspended and dissolved or partly dissolved substances which is distributed to the various flotation units in regulated quantities to maintain the desired conditions therein.

Further objects of the invention are to provide improved methods and means for forming the mixture of alkaline earth hydroxide and alkaline sulphide or the mixture of alkaline hydroxide and alkaline earth sulphide and for handling and distributing the mixture to the flotation units and for controlling the quantity of the mixture added in accordance with the condition to be maintained during flotation.

Other objects will more fully appear from the following description of the invention.

The accompanying drawing illustrates diagrammatically the arrangement of the preferred form of an apparatus for carrying out the invention.

While any suitable alkaline earth hydroxide and alkali sulphide or alkaline hydroxide and alkaline earth sulphide may be employed, slaked lime and sodium sulphide are generally preferable because of their availability and low cost. The mixture of slaked lime and sodium sulphide may be formed and added to the ores in any suitable manner. It is, however, most conveniently handled as an emulsion containing slaked lime or calcium hydroxide equivalent to 2% of burnt lime and about 2% of sodium sulphide in solution. To maintain the solids uniformly in solution and emulsion, the emulsion is contained in a supply tank provided with a suitable stirring or agitating apparatus and is circulated through distributing pipes in a complete circuit, returning to the supply tank so that the liquid is always in motion and there is no opportunity for the suspended substances to separate out at any point. From the circulating pipes a regulated stream of the emulsion is taken for each flotation unit and incorporated with the ore.

A preferred method of forming the mixture is as follows: A suitable amount of commercial lime is spread out in a box in a uniform layer and covered with an equal weight of sodium sulphide. Water is added, and the mass stirred and heated with live steam coils or other means, until all of the sodium sulphide lumps have passed into solution. The emulsion is now screened to remove any particles of unburned limestone and the undersize of the screen is stored in a tank. A comparatively large amount of water is added to the tank so that a combination emulsion and solution is produced, the quantity of water being preferably such as to produce a final emulsion containing approximately 2% of the original sodium sulphide, 2% of the original lime and 96% of water. It will be understood, however, that these proportions may be modified to suit conditions.

The mixture is kept in a supply tank as indicated at 1 in the figure, and is kept agitated by means of air, or by mechanical means such as the stirrer 2. A stream of emulsion is drawn from the tank 1 by means of a pump 3 and circulated through a distributing pipe 4 having a return pipe to the tank 1. The distributing pipe 4 extends through or past a number of flotation units indicated at 5, 6 and 7, three being shown by way of example, and a supply is withdrawn from the pipe 4 through draw-off pipes 8 to the flotation units.

Any excess of emulsion remaining after the withdrawal of supplies through the draw-off pipes 8 is returned to the tank 1 through a return pipe 9. This return of the emulsion should be continuous so that the amount of emulsion and solution in circulation is comparatively large with respect to the amount used in the process, thereby stabilizing the character of the mixture and keeping a reserve supply in the supply pipe 4 for emergencies.

From the circulating pipe 4 small amounts of the mixture are withdrawn through each of the withdrawal pipes 8 to each respective flotation unit. The amount of liquid thus drawn from the distributing pipe 4 is controlled by any suitable means such, for example, as the valve shown in United States Patent No. 1,657,663.

Assuming that the flotation plant consists of the usual grinding apparatus in open or closed circuit with classifiers followed by flotation units, the mixture of sodium sulphide, lime and water is preferably added to the grinding mill, indicated at 10, thereby obtaining a thorough mixing of the emulsion with the pulp and a maximum time of contact. The mixture then passes to the flotation units indicated at 11. It will be understood that the mixing and time of contact between the emulsion and the pulp could be obtained in other ways, such as with a pump and pipe lines, or with tanks equipped with mechanical agitators or any mechanically agitated flotation machine.

With every ore there is a certain condition of alkalinity or causticity of the flotation pulp under which the best metallurgical results are obtained. This optimum condition is determined for each ore by experiment. Once this point of optimum alkalinity is known, the condition of the emulsion is so controlled as to attain and maintain it in the flotation machines. For this purpose a small sample of clear water is drawn from the flotation circuit as indicated by a draw-off pipe 12 in the accompanying drawing, and the sample thus obtained is titrated with a dilute standard acid solution in the presence of a suitable indicator. If the titration shows that the alkalinity is too high, the rate of supply of sodium sulphide lime mixture is decreased. If the test shows that the alkalinity is too low, the rate of addition of the mixture is correspondingly increased.

Other alternative methods may be employed for preparing the mixture of calcium hydroxide and sodium sulphide. For example, a quantity of lime is put in a box and slaked with sufficient water and then screened to remove unslaked or unburned particles. To the undersize of the screen is then added a solution of sodium sulphide in the proportion required for the weight of lime used. After a thorough mixing of the slaked lime and sodium sulphide, water is added to thin the mixture to the required consistency or until the resulting emulsion contains two parts of lime and two parts of sodium sulphide.

The emulsion may then be circulated and distributed to the flotation units as described above or, the sodium sulphide and slaked or unslaked lime may be ground in a ball or rod mill, or other suitable grinding or pulverizing apparatus, and thence transferred to a tank and diluted with water.

Another method of forming the emulsion suitable for certain plant conditions is to slake and screen a quantity of lime mixed with water to an emulsion, the emulsion being stored and kept in agitation in a suitable supply tank. Commercial sodium sulphide is separately dissolved and stored. The lime emulsion is then circulated and supplied to the flotation units and the sodium sulphide solution is added continuously in definite fixed proportion to the lime mixture at such a point as to allow a sufficient time of contact between these two mixtures or solutions, the time of contact being controlled by local conditions.

Other methods of forming and supplying the lime and sodium sulphide mixtures will be obvious from the above examples, and it will be understood that other alkaline sulphides or mixtures of alkaline sulphides and other alkaline earth hydroxides or mixtures thereof may be utilized under certain economic or plant conditions. It will also be understood that alkaline earth sulphides or mixtures of alkaline earth sulphides and alkaline hydrates or mixtures thereof may be utilized if desired.

Through the use of the above flotation compound or emulsion and of the process of my invention, the recovery of metal from the ore is much greater than that obtainable by the use of either lime or sodium sulphide alone.

What I claim is:

1. In the flotation of sulphide and oxide ores, passing a mixture of lime and an alkali sulphide in an aqueous vehicle in a continuous circuit to and from a tank, withdrawing regulated quantities of said mixture from said circuit, and supplying said quantities to flotation units and incorporating said withdrawn mixture with ores in finely divided condition.

2. In the flotation of sulphide and oxide ores, passing a mixture of lime and an alkali sulphide in an aqueous vehicle in a continuous circuit to and from a tank, withdrawing regulated quantities of said mixture from said circuit, supplying said quantities to flotation units, grinding said withdrawn mixture with ores, and then frothing said ores.

3. In the flotation of sulphide and oxide ores, passing a mixture of lime and an alkali sulphide in an aqueous vehicle in a continuous circuit to and from a tank, withdrawing regulated quantities of said mixture from said circuit, supplying said quantities to flotation units, grinding said withdrawn mixture with ores, frothing said ores, and controlling the withdrawal and addition of said mixture to said flotation units to maintain a definite alkalinity in the flotation machines.

In witness whereof, I have hereunto signed my name.

GUY H. RUGGLES.